(12) United States Patent   (10) Patent No.: US 11,878,281 B2
Takeuchi et al.   (45) Date of Patent: Jan. 23, 2024

(54) REACTOR WITH JIG PROVIDED IN PIPE FOR TEMPERATURE MEASUREMENT

(71) Applicant: IHI CORPORATION, Tokyo (JP)

(72) Inventors: Yusuke Takeuchi, Tokyo (JP); Takuya Yoshinoya, Tokyo (JP); Daisuke Tsunoda, Tokyo (JP); Taiga Yamamoto, Tokyo (JP); Akihisa Yano, Tokyo (JP); Shunji Miyajima, Tokyo (JP); Shigeki Sakakura, Tokyo (JP); Hiroyuki Kamata, Tokyo (JP); Nobuyuki Honma, Tokyo (JP)

(73) Assignee: IHI CORPORATION, Tokyo (JP)

( * ) Notice: Subject to any disclaimer, the term of this patent is extended or adjusted under 35 U.S.C. 154(b) by 605 days.

(21) Appl. No.: 17/116,033

(22) Filed: Dec. 9, 2020

(65) Prior Publication Data

US 2021/0086162 A1   Mar. 25, 2021

Related U.S. Application Data

(63) Continuation of application No. PCT/JP2019/023225, filed on Jun. 12, 2019.

(30) Foreign Application Priority Data

Jun. 12, 2018 (JP) .................. 2018-111762

(51) Int. Cl.
*B01J 19/24* (2006.01)
*F28F 27/02* (2006.01)

(52) U.S. Cl.
CPC ............. *B01J 19/248* (2013.01); *F28F 27/02* (2013.01); *B01J 2219/0006* (2013.01);
(Continued)

(58) Field of Classification Search
CPC .................... B01J 19/248; B01J 19/249; B01J 2219/0006; B01J 2219/00961;
(Continued)

(56) References Cited

U.S. PATENT DOCUMENTS

2003/0063653 A1   4/2003   Park et al.
2014/0083666 A1   3/2014   Yang
(Continued)

FOREIGN PATENT DOCUMENTS

CN   203501858 U   3/2014
CN   106423004 A   2/2017
(Continued)

OTHER PUBLICATIONS

China National Intellectual Property Administration, "First Office Action," issued in Chinese Patent Application No. 201980039307.3, which is a counterpart to U.S. Appl. No. 17/116,033, dated Dec. 16, 2021, 7 pages.

(Continued)

*Primary Examiner* — Lessanework Seifu

(57) ABSTRACT

A reactor includes: a heat exchange section including: a first flow channel configured to flow a reaction fluid and a second flow channel configured to flow a heat medium; an introduction path for a temperature sensor, extending from an insertion opening provided on a side surface of the heat exchange section to the first flow channel or the second flow channel; a pipe for a temperature sensor, connected to a side surface of the heat exchange section and communicating with the introduction path through the insertion opening; and a jig provided in the pipe. The jig is provided with a guide hole extending from the base end toward the tip end and opened toward the insertion opening of the introduction path. The guide hole is provided with a tapered hole directed from the base end toward the tip end.

5 Claims, 7 Drawing Sheets

(52) U.S. Cl.
CPC ........... *B01J 2219/00081* (2013.01); *B01J 2219/00961* (2013.01); *B01J 2219/2401* (2013.01)

(58) Field of Classification Search
CPC ...... B01J 2219/2401; B01J 2219/00063; B01J 2219/2453; B01J 2219/2458; B01J 2219/2462; B01J 2219/2479; F28F 27/02; F28D 7/163; F28D 2021/0022; G01K 7/04; G01K 1/14
See application file for complete search history.

(56) References Cited

U.S. PATENT DOCUMENTS

| | | |
|---|---|---|
| 2014/0083667 A1 | 3/2014 | Yang |
| 2017/0299280 A1 | 10/2017 | Yang |
| 2018/0290121 A1 | 10/2018 | Takeuchi et al. |

FOREIGN PATENT DOCUMENTS

| | | | |
|---|---|---|---|
| CN | 205953540 U | | 2/2017 |
| CN | 206027670 U | | 3/2017 |
| CN | 206762878 U | | 12/2017 |
| CN | 107583525 A | | 1/2018 |
| CN | 109200967 A | | 1/2019 |
| GB | 818503 | * | 6/1959 |
| JP | S58-029419 U1 | | 2/1983 |
| JP | 2017-131796 A | | 8/2017 |
| JP | 2017-146210 A | | 8/2017 |
| WO | 2017/130965 A1 | | 8/2017 |

OTHER PUBLICATIONS

European Patent Office, "Extended European Search Report," issued in European Patent Application No. 19 818 989.6, which is a counterpart to U.S. Appl. No. 17/116,033, dated Jan. 26, 2022, 8 pages.

* cited by examiner

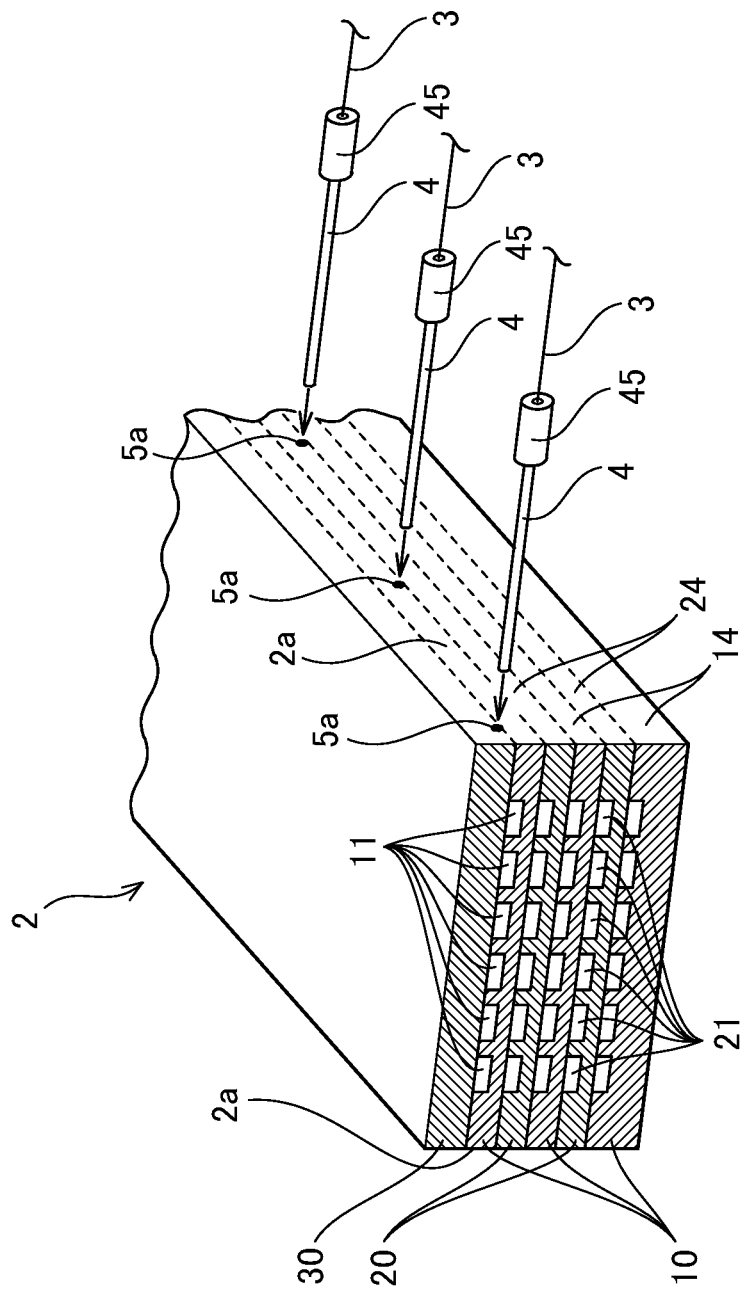

REACTOR WITH JIG PROVIDED IN PIPE FOR TEMPERATURE MEASUREMENT

CROSS REFERENCE TO RELATED APPLICATIONS

This application is a continuation application of International Application No. PCT/JP2019/023225, now WO 2019/240156, filed on Jun. 12, 2019, which claims priority to Japanese Patent Application No. 2018-111762, filed on Jun. 12, 2018, the entire contents of which are incorporated by reference herein.

BACKGROUND

1. Technical Field

The present disclosure relates to a reactor of a heat exchange type.

2. Description of the Related Art

A reactor of a heat exchange type makes proceed (promotes) a reaction of a reaction fluid containing a reaction material by heating or cooling it using a heating medium. Such a reaction apparatus includes, for example, a heat exchange section having a reaction channel through which a reaction fluid flows and a heat medium channel through which a heat medium flows.

The thermal energy balance between the reaction fluid and the heat medium affects the progress of the reaction in the reaction channel. Therefore, in order to make the reaction of the reaction fluid proceed efficiently, it is important to adjust the thermal energy balance well. For this purpose, it is desired that the temperature of the fluid flowing in the reactor can be measured. In this regard, a reactor disclosed in Japanese Patent Application Laid-Open Application No. 2017-131796 includes a detection unit for detecting the temperature of a fluid flowing through the flow channel of at least one of a reaction fluid and a heat medium in a heat exchange unit.

SUMMARY

As described above, in order to accurately understand the progress of the reaction, it is necessary to install temperature sensors in various places of the heat exchange unit. On the other hand, when the temperature sensor is installed in the flow channel, it is desired to have a structure in which the flow of the fluid is not inhibited and pressure loss is unlikely to be caused. Under such circumstances, a temperature sensor having an elongated shape such as a thermocouple is preferred, which becomes more effective as the flow area of each flow channel in the reactor decreases. However, while the temperature sensor having such a shape is easily bent, the installation structure of the temperature sensor becomes very small. Also, when the pressure of the reaction fluid is high, a step may be formed in the insertion path of the temperature sensor due to manufacturing or structural constraints. For these reasons, an enormous amount of time is spent for the installation work.

It is an object of the present disclosure to provide a reactor in which a temperature sensor is easily installed in a heat exchange section of the reactor.

A reactor according to the present disclosure includes: a heat exchange section including: a first flow channel configured to flow a reaction fluid and a second flow channel configured to flow a heat medium; an introduction path for a temperature sensor, extending from an insertion opening provided on a side surface of the heat exchange section to the first flow channel or the second flow channel; a pipe for a temperature sensor, connected to a side surface of the heat exchange section and communicating with the introduction path through the insertion opening; and a jig provided in the pipe, including a tip end facing the insertion opening of the introduction path and a base end positioned on a side opposite to the tip end; wherein the jig is provided with a guide hole extending from the base end toward the tip end and opened toward the insertion opening of the introduction path, and the guide hole is provided with a tapered hole tapered from the base end toward the tip end.

The jig may be movably provided in the pipe. The jig may include a large-diameter portion located on a base end side and a small-diameter portion located on a tip end side, the small-diameter portion having an outer diameter smaller than an outer diameter of the large-diameter portion. The pipe may include a thin-wall part having an inner diameter of the maximum diameter or more of the jig, and a thick-wall part having an inner diameter of less than the maximum diameter of the jig. The thin-wall part may be located at an end portion of the pipe facing the side surface of the heat exchange section. The inner diameter of the thick-wall part may be less than the opening diameter of the tapered hole at the base end of the jig. The jig may be fixed in the pipe.

According to the present disclosure, it is possible to provide a reactor in which installation of a temperature sensor is easy in a heat exchange section.

BRIEF DESCRIPTION OF THE DRAWINGS

FIG. 4 is a perspective view illustrating a part of a heat exchange section and a cross section thereof according to the present embodiment.

FIGS. 5A and 5B are enlarged sectional views illustrating an introduction path of a temperature sensor and a periphery thereof according to the present embodiment, wherein FIG. 5A is a sectional view when viewed in an extending direction of a first flow channel, and FIG. 5B is a sectional view taken along line b-b in FIG. 5A.

FIGS. 8A and 8B are views illustrating exemplary modifications of the jig according to the present embodiment, wherein FIG. 8A is a side view illustrating a first modification, and FIG. 8B is a side view illustrating a second modification.

DESCRIPTION OF THE EMBODIMENTS

Figure 1:
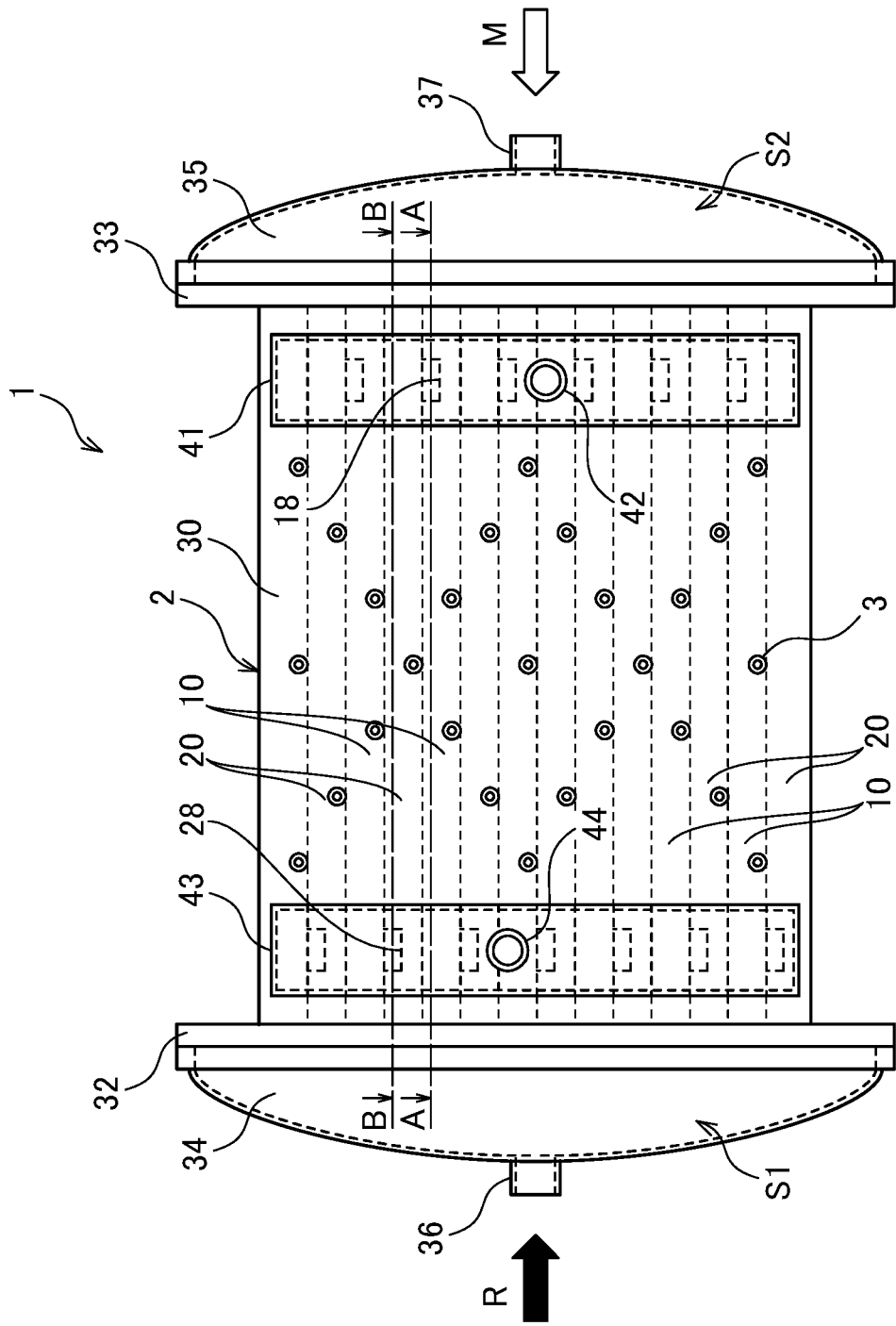
FIG. 1 is a side view illustrating a reactor according to the present embodiment.

Embodiments of the present disclosure will be described below with reference to the drawings. The same reference numerals are used to denote the same parts in the drawings, and the description thereof will be omitted.

Figure 2:
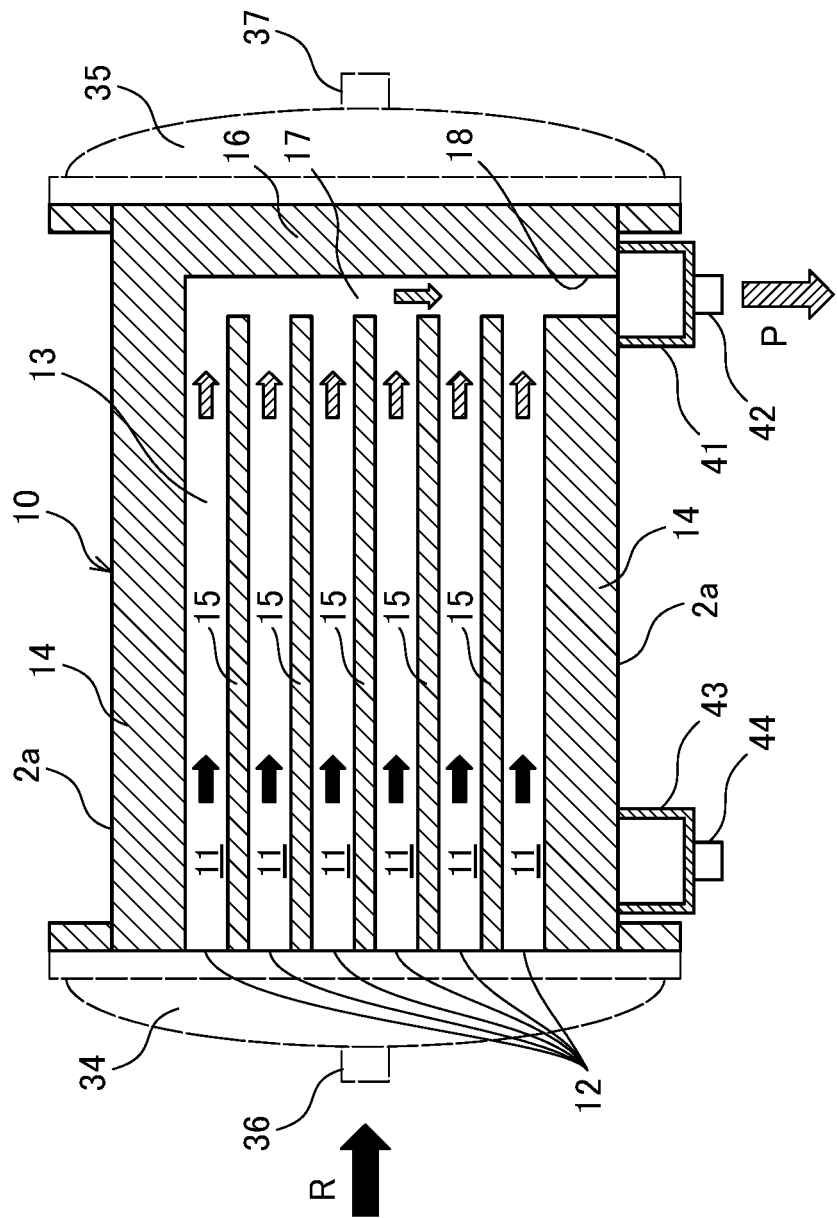
FIG. 2 is a sectional view taken along line A-A in FIG. 1.
Figure 3:
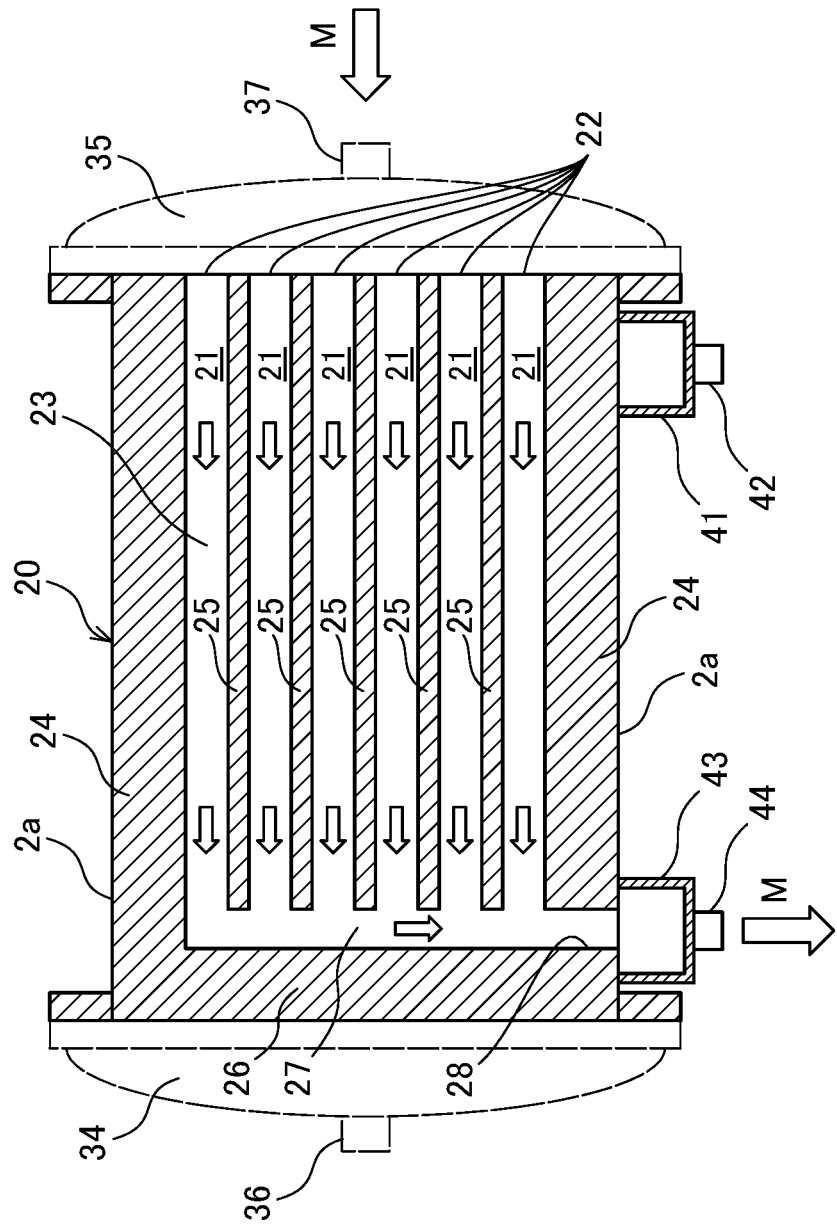
FIG. 3 is a sectional view taken along line B-B in FIG. 1.

FIG. 1 is a side view illustrating a reactor 1 according to the present embodiment. FIG. 2 is a sectional view taken along line A-A in FIG. 1. FIG. 3 is a sectional view taken along line B-B in FIG. 1. The structure associated with the temperature sensor 3, such as the introduction path 5, is not shown in FIGS. 2 and 3 for the sake of convenience of description. The reactor 1 heats or cools the reaction fluid by heat exchange between the heat medium and the reaction fluid containing the reaction material, thereby advancing (promoting) the reaction of the reaction fluid. The reactor 1 is sometimes referred to as a chemical reactor.

The reactor 1 includes a heat exchange section 2. The heat exchange section 2 includes first thermal conductors (first heat conductive bodies) 10, second thermal conductors (second heat conductive bodies) 20, and a cover plate 30. The first thermal conductors 10, the second thermal conductors 20, and the cover plate 30 are flat plate members formed of a thermally conductive material having heat resistance. These have a sufficient thickness to withstand a high internal pressure generated during when a reaction fluid R flows.

The first thermal conductor 10 has a first flow channel 11 to flow a reaction fluid. On the other hand, the second thermal conductor 20 has a second flow channel 21 to flow the heat medium. The first thermal conductor 10 and the second thermal conductor 20 are alternately stacked, and a cover plate 30 is attached on the uppermost part (or the bottom) of them. As described later, the heat exchange section 2 according to the present embodiment has a countercurrent type structure in which the reaction fluid and the heat medium flow in opposite directions. The heat exchange section 2 may have a concurrent type structure in which the reaction fluid and the heat medium flow in the same direction.

Both ends of the heat exchange section 2 as a stacked body are held by fixation members 32, 33. A reaction fluid inlet section 34 is attached to the fixation member 32. The reaction fluid inlet section 34 is a concave curved lid, and forms a space S1 between the reaction fluid inlet section 34 and the heat exchange section 2. First inlet ports 12 of the first flow channels 11 are opened into the space S1 (See FIG. 2). The reaction fluid inlet section 34 has a first introduction conduit 36 for introducing the reaction fluid R. The reaction fluid R flows through the first introduction conduit 36 into each first flow channel 11.

The product outlet section 41 is a box-shaped member having an open surface. The product outlet section 41 is attached to the heat exchange section 2 so that the open surface faces first outlet ports 18 of the first thermal conductors 10. The product outlet section 41 has a first outlet conduit 42. The first outlet conduit 42 discharges a reaction gas P containing a product derived from the reaction fluid R.

A heat medium inlet section 35 is attached to the fixation member 33. As similar to the reaction fluid inlet section 34, the heat medium inlet section 35 is a concave curved lid and forms a space S2 between the heat medium inlet section 35 and the heat exchange section 2. The second inlet ports 22 of the second flow channels 21 are opened into the space S2. The heat medium inlet section 35 has a second introduction conduit 37 for introducing the heat medium M. The heat medium M flows through the second introduction conduit 37 into each second flow channel 21.

As similar to the product outlet section 41, the heat medium outlet section 43 is a box-shaped member having an open surface. The heat medium outlet section 43 is attached to the heat exchange section 2 so that the open surface faces the second outlet ports 28 of the second thermal conductors 20. The heat medium outlet section 43 has a second outlet conduit 44. The second outlet conduit 44 discharges the heat medium M which has flowed through the heat exchange section 2.

As shown in FIG. 2, the first thermal conductor 10 has first flow channels 11 each including a reaction region. The main reaction region of the first flow channel 11 is, for example, an intermediate portion thereof. In the first flow channel 11, the reaction fluid R reacts by receiving heat from a heat medium flowing through the second flow channel 21 in the second thermal conductor 20 as described later, thereby generating a reaction gas P containing a product derived from the reaction fluid R.

The first flow channel 11 is a groove formed on one surface (the upper surface in the present embodiment) of the first thermal conductor 10. The first flow channel 11 has a rectangular cross section. The first flow channel 11 extends straight from the first inlet port 12 positioned on the fixation member 32 side toward the fixation member 33. As shown in FIG. 2, the first flow channels 11 are arranged in parallel.

The first thermal conductor 10 includes a first partition wall 13, two first side walls 14, first intermediate walls 15, and a first end wall 16. The first side walls 14, the first intermediate walls 15 and the first end wall 16 are provided on one surface of the first partition wall 13. The first partition wall 13 is a rectangular wall and defines the overall shape of the first thermal conductor 10. The first side walls 14 are wall portions provided on both sides of the first flow channels 11 extending in their extending direction. The first intermediate walls 15 are wall portions located between the two first side walls 14. The first intermediate walls 15 are provided in parallel with the first side walls 14.

The first end wall 16 is provided on the opposite side of the first flow channels 11 from the first inlet port 12. The first end wall 16 extends in the arrangement direction of the first flow channels 11. The first end wall 16 prevents the inflow of the reaction gas P into the space S2.

The first thermal conductor 10 has a first link channel 17 extending along the first end wall 16. The first link channel 17 communicates with all the first flow channels 11 and communicates with the first outlet port 18. Same as the first flow channel 11, the first link channel 17 is a flow channel to flow the reaction fluid R and the reaction gas P. There is no substantial difference between the channels.

As shown in FIG. 3, the second thermal conductor 20 has second flow channels 21. The second flow channel 21 supplies the heat of the heat medium M to the first thermal conductor 10.

The second flow channel 21 is formed on one surface (in the present embodiment, the upper surface) of the second thermal conductor 20. The second flow channel 21 is a groove having a rectangular cross section. The second flow channel 21 extends linearly from the second inlet port 22 positioned on the fixation member 33 side toward the fixation member 32. As shown in FIG. 3, the second flow channels 21 are arranged in parallel.

The second thermal conductor 20 includes a second partition wall 23, two second side walls 24, second intermediate walls 25, and a second end wall 26. The second side walls 24, the second intermediate walls 25 and the second end wall 26 are provided on one surface of the second partition wall 23. That is, these are provided on the surface equivalent to the surface of the first partition wall 13 on which the first side walls 14 and the like are provided. The second partition wall 23 is a rectangular wall and defines the overall shape of the second thermal conductor 20. The second side walls 24 are wall portions provided on both sides of the second flow channels 21 extending in their extending direction. The second intermediate walls 25 are wall portions located between the two second side walls 24. The second intermediate walls 25 are provided in parallel with the second side walls 24.

The second end wall 26 is provided on the opposite side of the second flow channel 21 from the second inlet port 22. The second end wall 26 extends in the arrangement direction of the second flow channels 21. The second end wall 26 prevents the inflow of the heat medium M into the space S1.

The second thermal conductor 20 has a second link channel 27 extending along the second end wall 26. The second link channel 27 communicates with all the second flow channels 21 and communicates with the second outlet port 28.

A structured catalyst (not shown) may be provided in the first flow channel 11 to promote the reaction. The catalyst contained in the structured catalyst is appropriately selected based on the synthetic reaction performed in the reactor 1. The catalyst is suitable for promoting the progress of the chemical reaction and has an active metal effective as a main component. Examples of the active metal as the catalyst component include Ni (nickel), Co (cobalt), Fe (iron), Pt (platinum), Ru (ruthenium), Rh (rhodium), Pd (palladium), or the like. One or a combination of plurals from among them may be used as long as they are effective for promoting the reaction. The structured catalyst is formed, for example, by supporting the catalyst on a structural material. The structural material is selected from heat-resistant metals which can be molded and can carry a catalyst.

The heat exchange section 2 can be used as any of a liquid-liquid type, a gas-gas type, and a gas-liquid type. The reaction fluid and the heating medium may be any of a gas and a liquid. The reactor 1 according to the present embodiment can perform chemical synthesis by various thermal reactions such as endothermic reactions and exothermic reactions. Syntheses by such thermal reaction are the following reactions, for example: an endothermic reaction such as a steam methane reforming reaction represented by formula (1), or a dry methane reforming reaction represented by formula (2); and an exothermic reaction such as a shift reaction represented by formula (3), a methanation reaction represented by formula (4), or a Fischer-Tropsch synthetic reaction represented by formula (5). The reaction fluid in these reactions is a gas.

$$CH_4 + H_2O \rightarrow 3H_2 + CO \qquad (1)$$

$$CH_4 + CO_2 \rightarrow 2H_2 + 2CO \qquad (2)$$

$$CO + H_2O \rightarrow CO_2 + H_2 \qquad (3)$$

$$CO + 3H_2 \rightarrow CH_4 + H_2O \qquad (4)$$

$$(2n+1)H_2 + nCO \rightarrow C_nH_{2n+2} + nH_2O \qquad (5)$$

The heating medium is preferably a material which does not corrode the constituent material of the reactor 1. When a heating gas is used as a heating medium, a gaseous substance such as combustion gas and heated air can be used. The heating medium may be, for example, a liquid material such as water or oil.

Figure 5A:
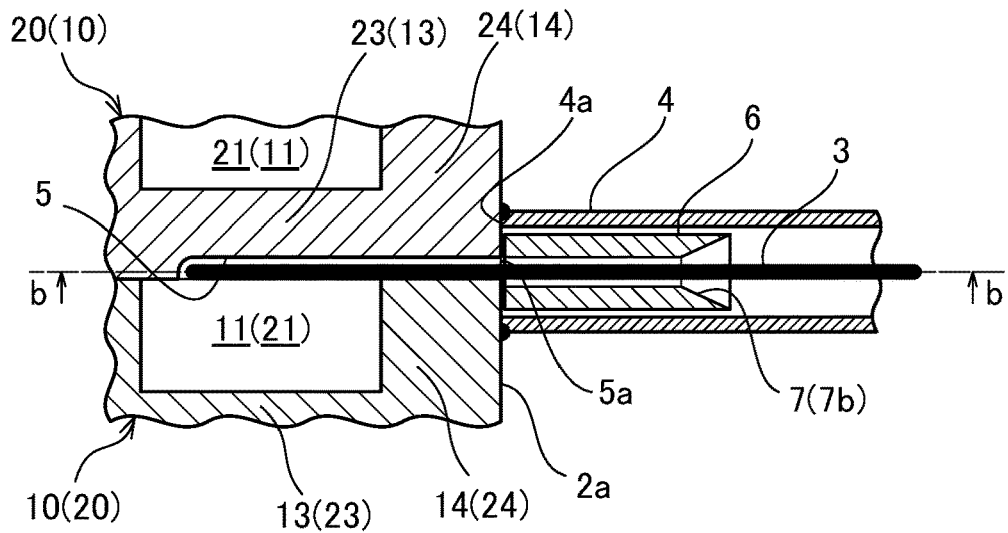
Figure 5B:
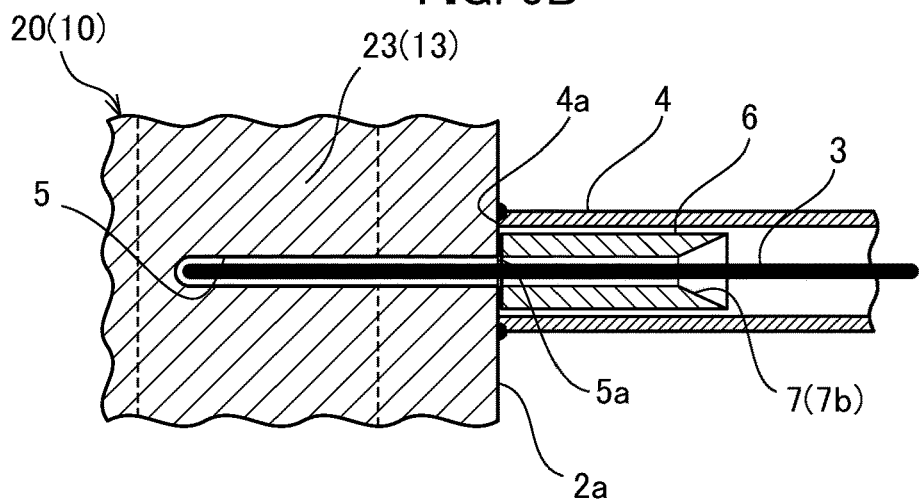

FIG. 4 is a perspective view illustrating a part of a heat exchange section 2 and a cross section thereof. FIGS. 5A and 5B are enlarged sectional views illustrating an introduction path 5 (described later) of a temperature sensor 3 and a periphery of the introduction path 5. FIG. 5A is a sectional view when viewed in the extending direction of the first flow channel 11 and the second flow channel 21. FIG. 5B is a sectional view taken along line b-b in FIG. 5A. The temperature sensor 3 according to the present embodiment is a thermocouple having an outer diameter of about 1 mm to several mm. According to the specifications of the reactor 1, a resistance temperature detector having the same outer diameter can be used as a temperature sensor.

As described above, the heat exchange section 2 includes the stacked body of the first thermal conductor 10 and the second thermal conductor 20 which are alternately stacked, and the cover plate 30 installed on the uppermost part of the stacked body. The first flow channel 11 and the second flow channel 21 are adjacent to each other without contact via the first partition wall 13 or the second partition wall 23.

As shown in FIG. 4, the heat exchange section 2 is formed into a rectangular parallelepiped structure having side surfaces 2a by alternately stacking the first thermal conductor 10 and the second thermal conductor 20 and attaching the cover plate 30. The side surfaces 2a are positioned along the first flow channels 11 and the second flow channels 21 on both sides in the respective arrangement directions of the first flow channel 11 and the second flow channel 21. The side surface 2a is provided with an insertion opening 5a of an introduction path 5 into which the temperature sensor 3 is inserted. In order to facilitate insertion of the temperature sensor 3, the edge of the insertion opening 5a may be chamfered (see FIG. 9).

As described later, the introduction path 5 communicates with the first flow channel 11 or the second flow channel 21. The pipe 4 of the temperature sensor 3 is connected to the side surface 2a in order to prevent the reaction fluid R or the heat medium M from flowing out of the introduction path 5 and to protect the temperature sensor 3.

As shown in FIG. 5A, the tip end (end portion) 4a of the pipe 4 is fixed to the side surface 2a to surround the insertion opening 5a. The tip end 4a of the pipe 4 is fixed to the side surface 2a so that the central axes of the pipe 4 and the insertion opening 5a coincide with each other. Therefore, the pipe 4 communicates with the introduction path 5 through the insertion opening 5a. The pipe 4 is fixed to the side surface 2a by welding over the entire circumference to prevent leakage of fluid from between the side surface 2a and the pipe 4 and to withstand high pressure generated in the pipe 4. The rear end of the pipe 4 is sealed by a well-known joint 45 holding the temperature sensor 3.

The introduction path 5 of the temperature sensor 3 extends from the insertion opening 5a and communicates with the first flow channel 11 or the second flow channel 21. The introduction path 5 and the first flow channel 11 or the second flow channel 21 are positioned as skew lines. For example, the introduction path 5 is formed on a surface of the first partition wall 13 opposite to the surface on which the first flow channels 11 are provided, or on a surface of the second partition wall 23 opposite to the surface on which the second flow channels 21 are provided. Here, the first partition wall 13 and the second partition wall 23 are thick enough to withstand a high internal pressure generated during when the reaction fluid R flows. Therefore, the introduction path 5 can be formed.

As described above, the introduction path 5 extends from the insertion opening 5a while the introduction path 5 and the first flow channel 11 or the second flow channel are positioned as the skew lines. Therefore, the temperature sensor 3 can be installed at a desired position while suppressing interference of the temperature sensor 3 with the flow of the reaction fluid R or the heat medium M to be measured.

The temperature sensor 3 is inserted into the introduction path 5 through the pipe 4. The inner dimension (inner diameter) of the introduction path 5 including the insertion opening 5a is about the same (e.g. 1 mm to several mm) as the outer dimension (outer diameter) of the temperature sensor 3. On the other hand, the wall thickness of the pipe 4 is set to a value which has sufficient strength (tolerance) with respect to the high pressure generated in the pipe 4, suppresses an excessive increase in weight, and ensures reliable connection between the pipe 4 and the heat exchange section 2 by welding or the like and sealing of the internal space. Therefore, the inner dimension (inner diameter) of the pipe 4 is set to a value sufficiently larger than the inner dimension (inner diameter) of the introduction path 5. For example, the value is set to several times of the inner dimension (inner diameter) of the introduction path 5.

Such a difference between the aforementioned internal dimensions forms a step around the insertion opening 5a. Therefore, in a state where the pipe 4 is fixed to the heat exchange section 2, it becomes difficult to insert the temperature sensor 3 into the insertion opening 5a. When the length of the temperature sensor 3 reaches several hundred mm, the insertion work (installation work) is hindered. According to the present embodiment, as shown in FIG. 5, the jig 6 is provided in the pipe 4. The jig 6 guides the tip end of the temperature sensor 3 inserted into the pipe 4 to the insertion opening 5a.

Figure 6:
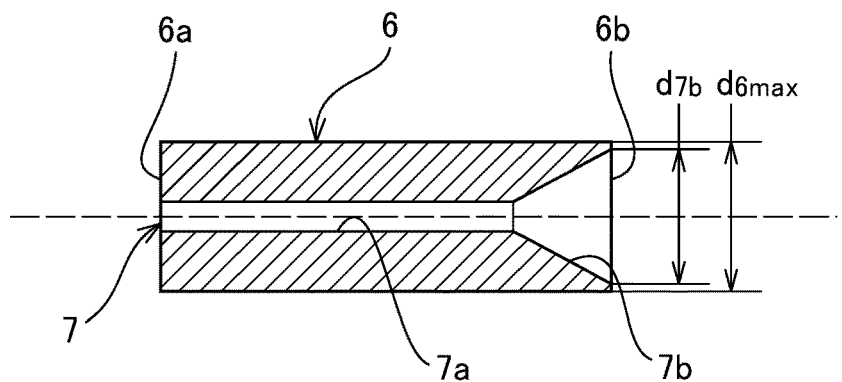
FIG. 6 is a sectional view of a jig according to the present embodiment.

FIG. 6 is a sectional view of the jig 6 according to the present embodiment. As shown in this figure, the jig 6 is a rod body extending in a direction. The jig 6 has an external shape (cross-sectional shape) adapted to the internal shape (cross-sectional shape) of the pipe 4. For example, the jig 6 is formed into an axisymmetric cylindrical shape extending in a direction.

The jig 6 has a tip end 6a facing the insertion opening 5a of the introduction path 5, and a base end 6b positioned on the side opposite to the tip end 6a. The jig 6 is provided with a guide hole 7. The guide hole 7 extends from the base end 6b toward the tip end 6a and opens toward the insertion opening 5a of the introduction path 5. The guide hole 7 is formed at the center of the jig 6.

The guide hole 7 is provided with (includes) a tapered hole (tapered section) 7b. The tapered hole 7b extends from the base end 6b toward the tip end 6a, and communicates with a through hole 7a. In other words, the guide hole 7 is formed of the through hole 7a formed on the tip end 6a side and the tapered hole 7b formed on the base end 6b side. While the through hole 7a has a constant inner diameter, the tapered hole 7b is located on the same axis as the through hole 7a and extends while reducing the inner diameter to the inner diameter of the through hole 7a. Here, the guide hole 7 may be formed of only the tapered hole 7b. In this case, the tapered hole 7b extends from the base end 6b to the tip end 6a. The opening diameter $d_{7b}$ of the tapered hole 7b has a maximum diameter $d_{6max}$ of the jig 6 or a value close thereto.

The jig 6 is movably provided in the pipe 4. That is, the maximum diameter $d_{6max}$ of the jig 6 is substantially equal to the inner diameter of the pipe 4. In other words, the maximum diameter $d_{6max}$ of the jig 6 is set to values such that the central axis of the jig 6 is not excessively inclined. As described above, the tip end 4a of the pipe 4 is fixed to the side surface 2a so that the central axes of the pipe 4 and the insertion opening 5a coincide with each other. Therefore, with the aforementioned size of the pipe 4, it is possible to maintain a state where the opening of the guide hole 7 on the tip end 6a side faces the insertion opening 5a. Further, since the jig 6 and the pipe 4 are separately provided from each other, it is possible to manufacture the jig 6 matching the shape (e.g. outer dimensions) of the temperature sensor 3, and to avoid unnecessary machining of the pipe 4.

Figure 7A:
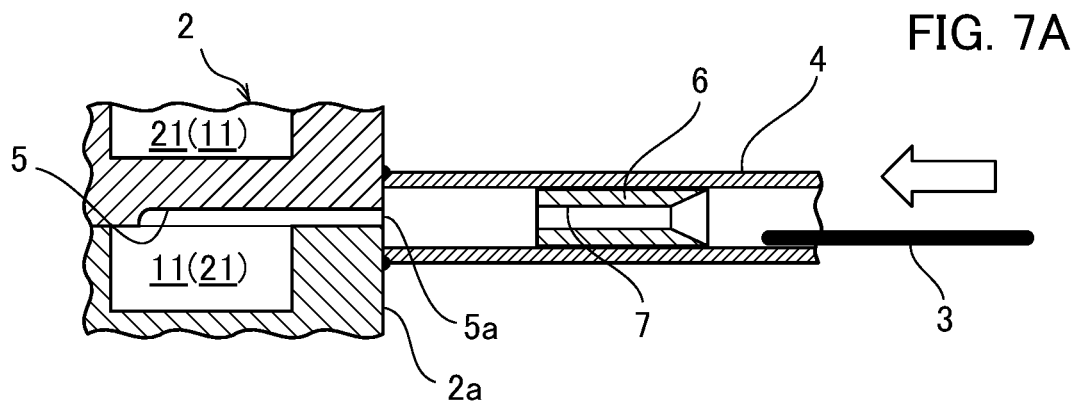
FIGS. 7A to 7D are views illustrating a stepwise procedure to install the temperature sensor into the introduction path.
Figure 7B:
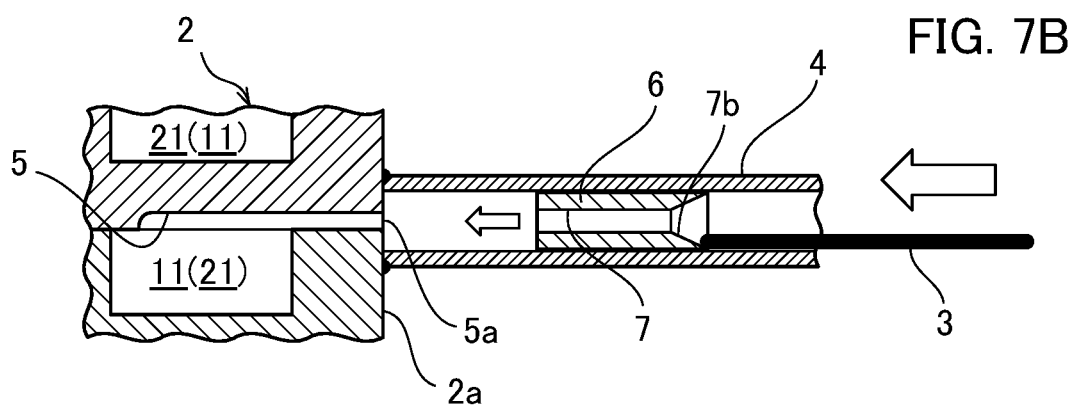
Figure 7C:
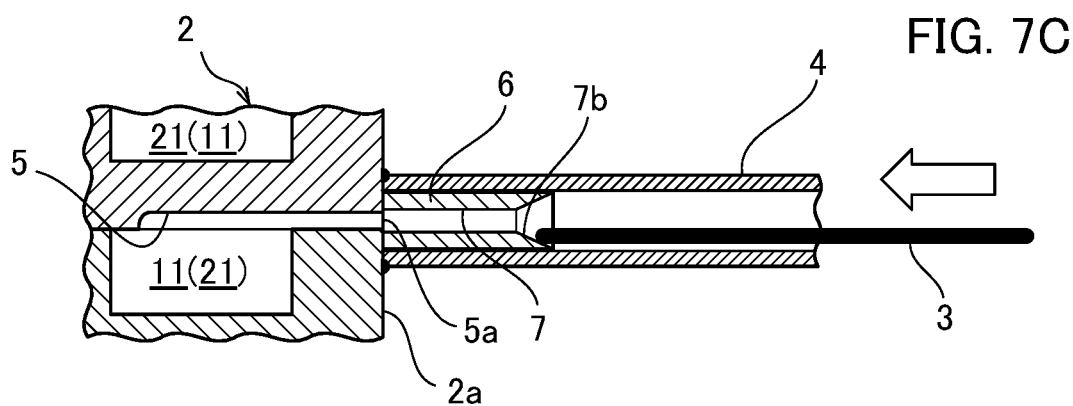
Figure 7D:
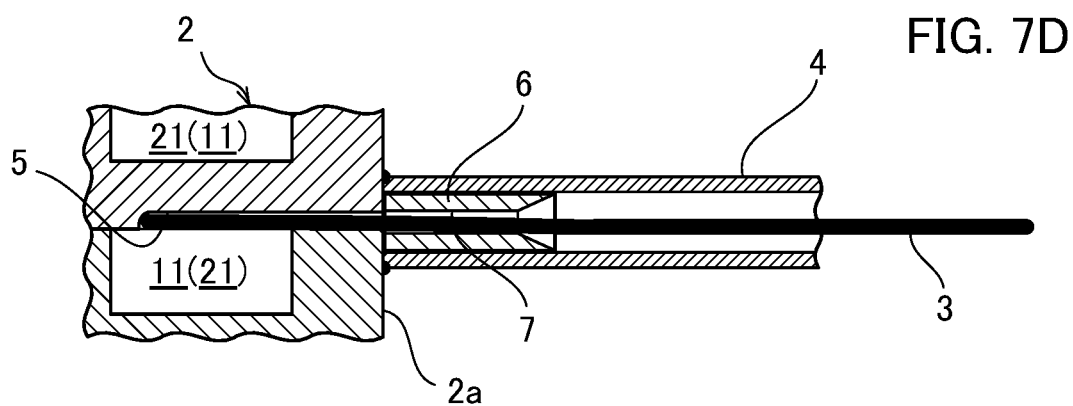

FIGS. 7A to 7D are views illustrating a stepwise procedure to install the temperature sensor 3 into the introduction path 5 in a state where the pipe 4 is fixed to the side surface 2a of the heat exchange section 2. FIG. 7A shows the initial state of the procedure, and the process goes through the states as shown in FIGS. 7B and 7C to reach the final state as shown in FIG. 7D.

As shown in FIG. 7A, the jig 6 is inserted into the pipe 4 before the pipe 4 is fixed to the side surface 2a of the heat exchange section 2. Alternatively, the jig 6 is inserted from the rear end of the pipe 4 after the pipe 4 is fixed to the side surface 2a of the heat exchange section 2. In both cases, the temperature sensor 3 is inserted from the rear end of the pipe 4 after the jig 6 is set in the pipe 4.

As shown in FIG. 7B, when the temperature sensor 3 is inserted into the pipe 4, the tip end of the temperature sensor 3 comes into contact with the tapered hole 7b of the jig 6. As described above, the jig 6 is movably provided in the pipe 4. Therefore, when the temperature sensor 3 is further inserted, the jig 6 also moves toward the side surface 2a (insertion opening 5a) of the heat exchange section 2.

As shown in FIG. 7C, when the temperature sensor 3 is further inserted, the tip end 6a of the jig 6 comes into contact with the side surface 2a of the heat exchange section 2. Thus, the movement of the jig 6 is regulated. On the other hand, the tip end of the temperature sensor 3 slides on the slope of the tapered hole 7b so as to approach the central axis of the jig 6. Thereafter, the temperature sensor 3 passes through the guide hole 7 and enters the insertion opening 5a of the heat exchange section 2.

As shown in FIG. 7D, the tip end of the temperature sensor 3 finally reaches a predetermined position of the introduction path 5. The predetermined position is a position exposed to the first flow channel 11, for example. That is, the temperature sensor 3 (tip end of the temperature sensor 3) reaches a predetermined position of the introduction path 5 from the pipe 4 through the guide hole 7 of the jig 6 and the insertion opening 5a of the heat exchange section 2.

As described above, the jig 6 assists the insertion of the temperature sensor 3 into the insertion opening 5a. The tapered hole 7b is provided on the base end 6b side of the jig 6, and the opening faces the tip end of the temperature sensor 3. Therefore, when the temperature sensor 3 is inserted, the tip end of the temperature sensor 3 can be guided to the central axis of the jig 6, in other words, to the position (height) where the insertion opening 5a of the heat exchange section 2 is provided. Therefore, the insertion work of the temperature sensor 3 is facilitated. That is, the temperature sensor 3 can be easily installed in the heat exchange section 2.

Figure 8A:
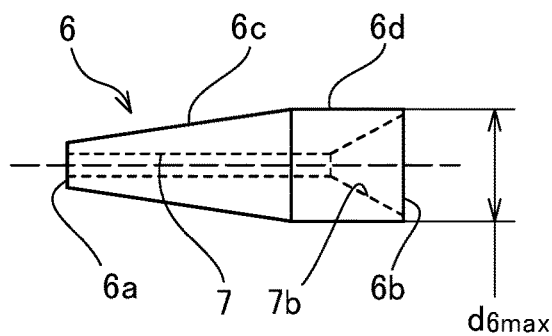
Figure 8B:
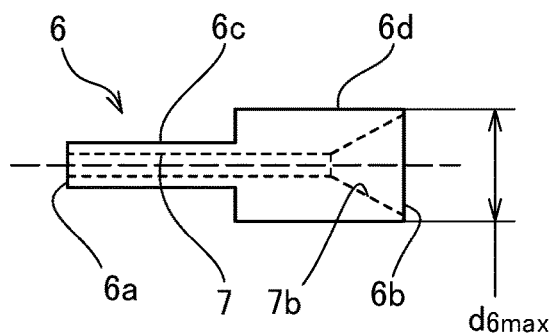

FIGS. 8A and 8B are views illustrating exemplary modifications of the jig 6 according to the present embodiment, wherein FIG. 8A is a side view illustrating a first modification, and FIG. 8B is a side view illustrating a second modification. As shown in these figures, the jig 6 may include a small-diameter portion 6c located on the tip end 6a side and a large-diameter portion 6d located on the base end 6b side. In this case, the small-diameter portion 6c has an outer diameter smaller than that of the large-diameter portion 6d. The diameter of the large-diameter portion 6d is set to the maximum diameter $d_{6max}$ of the jig 6. On the other hand, the small-diameter portion 6c may have a tapered shape as shown in FIG. 8A, or a cylindrical shape having a constant outer diameter as shown in FIG. 8B. In either case, the tip end 6a of the jig 6 does not contact an inner surface of the pipe 4 near the tip end 4a of the pipe 4. Therefore, when the pipe 4 is welded to the side surface 2a of the heat exchange section 2, thermal deformation and melting of the jig 6 can be prevented.

Figure 9:
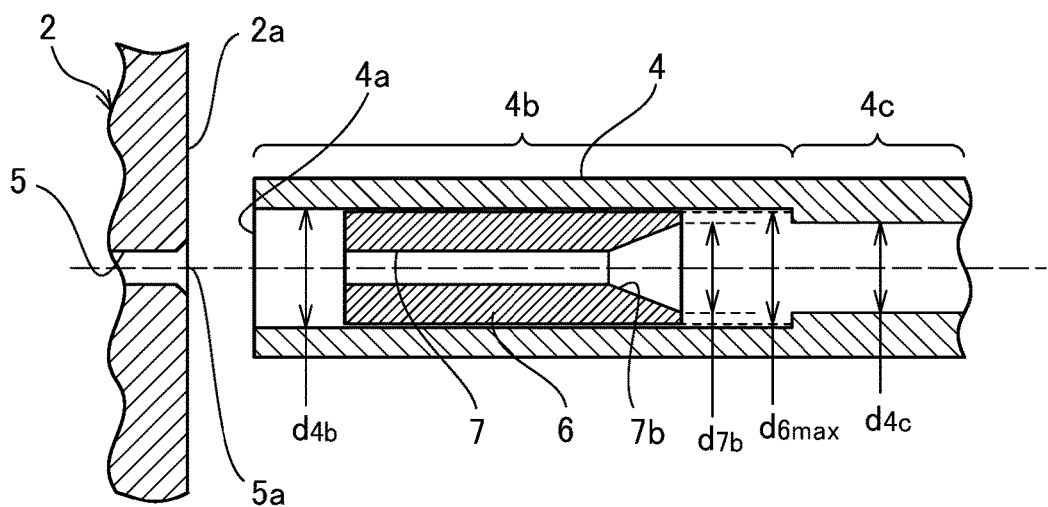
FIG. 9 is a sectional view illustrating an exemplary modification of a pipe according to the present embodiment.

FIG. 9 is a sectional view illustrating a modification of the pipe 4. As shown in this figure, the pipe 4 may include a thin-wall part 4b and a thick-wall part 4c. The thin-wall part 4b has an inner diameter $d_{4b}$ of the maximum diameter $d_{6max}$ or more of the jig 6. The thick-wall part 4c has an inner diameter $d_{4c}$ of less than the maximum diameter $d_{6max}$ of the jig 6. In this case, the thin-wall part 4b is located at the tip end (end portion) 4a of the pipe 4 facing the side surface 2a of the heat exchange section 2.

Even when the overall length of the pipe 4 is relatively long (e.g. about 1 m or more), as long as the inner diameter of the pipe 4 is constant and the pipe 4 is not excessively bent, the jig 6 can move along the entire length of the pipe 4. In such a situation, when the jig 6 is positioned near the rear end of the pipe 4, that is, near the joint 45 (see FIG. 4), it is necessary to push the jig 6 using a means such as a bar member or the like and move it to the vicinity of the heat exchange section 2. When the number of the temperature sensors 3 is large, such an increase of the moving operations hinders efficient operations.

When the pipe 4 is provided with the thin-wall part 4b as shown in FIG. 9, the moving range of the jig 6 is limited to a range in which the thin-wall part 4b is formed. Therefore, since the position of the jig 6 can be specified within the thin-wall part 4b, the above-described moving operation can be omitted. When the pipe 4 is bent, an accident in which the jig 6 is positioned between the bent part and the rear end of the pipe 4 can be avoided.

When the thin-wall part 4b is provided, the inner diameter $d_{4c}$ of the thick-wall part 4c may be equal to or smaller than the opening diameter $d_{7b}$ of the tapered hole 7b at the base end 6b of the jig 6. If the inner diameter $d_{4c}$ of the thick-wall part 4c is equal to or smaller than the opening diameter $d_{7b}$ of the tapered hole 7b, the tip end of the temperature sensor 3 does not abut against a step formed by the inner surface of the pipe 4 and the jig 6 when the temperature sensor 3 is inserted. That is, the temperature sensor 3 can be smoothly inserted, and the installation work of the temperature sensor 3 is improved.

Figure 10:
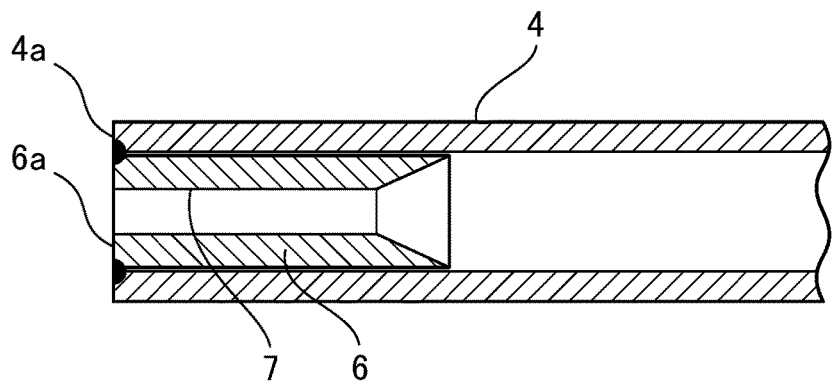
FIG. 10 is a sectional view illustrating an exemplary modification of the present embodiment.

FIG. 10 is a sectional view illustrating a modification of the present embodiment. As shown in this figure, the jig 6 may be fixed in the pipe 4. The jig 6 is fixed in the pipe 4 by spot welding or press-fitting. When the heat deformation or the like of the jig 6 is not of concern when the pipe 4 is welded to the heat exchange section 2, the positional confirmation of the jig 6 and the moving process thereof can be omitted, so that the installation work of the temperature sensor 3 can be improved.

It should be noted that the present disclosure is not limited to the embodiments described above, but is indicated by the description of the claims and further includes all modifications within the meaning and scope of the description of the claims.

What is claimed is:

1. A reactor comprising:
    a heat exchange section including:
        a first flow channel configured to flow a reaction fluid, and
        a second flow channel configured to flow a heat medium;
    an introduction path for a temperature sensor, extending from an insertion opening provided on a side surface of the heat exchange section to the first flow channel or the second flow channel;
    a pipe for a temperature sensor, connected to the side surface of the heat exchange section and communicating with the introduction path through the insertion opening; and
    a jig provided in the pipe, including a tip end facing the insertion opening of the introduction path and a base end positioned on a side opposite to the tip end;
    wherein
        the jig is provided with a guide hole extending from the base end toward the tip end and opened toward the insertion opening of the introduction path,
        the guide hole is provided with a tapered hole directed from the base end toward the tip end,
        the pipe includes a thin-wall part having an inner diameter of the maximum diameter or more of the jig, and a thick-wall part having an inner diameter of less than the maximum diameter of the jig, and
        the thin-wall part is located at an end portion of the pipe facing the side surface of the heat exchange section.

2. The reactor according to claim 1, wherein the jig is movably provided in the pipe.

3. The reactor according to claim 2, wherein the jig includes a large-diameter portion located on a base end side and a small-diameter portion located on a tip end side, the small-diameter portion having an outer diameter smaller than an outer diameter of the large-diameter portion.

4. The reactor according to claim 1, wherein the inner diameter of the thick-wall part is less than the opening diameter of the tapered hole at the base end of the jig.

5. The reactor according to claim 1, wherein the jig is fixed in the pipe.

* * * * *